United States Patent
Steffen et al.

(10) Patent No.: US 11,372,672 B2
(45) Date of Patent: Jun. 28, 2022

(54) CENTRALIZED TASK SCHEDULING

(71) Applicant: Apple Inc., Cupertino, CA (US)

(72) Inventors: Daniel Andreas Steffen, Mountain View, CA (US); Kevin James Van Vechten, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 320 days.

(21) Appl. No.: 14/174,658

(22) Filed: Feb. 6, 2014

(65) Prior Publication Data
US 2014/0237476 A1    Aug. 21, 2014

Related U.S. Application Data

(60) Provisional application No. 61/765,628, filed on Feb. 15, 2013.

(51) Int. Cl.
*G06F 9/46* (2006.01)
*G06F 9/50* (2006.01)
*G06F 9/48* (2006.01)

(52) U.S. Cl.
CPC .............. *G06F 9/46* (2013.01); *G06F 9/4843* (2013.01); *G06F 9/505* (2013.01)

(58) Field of Classification Search
CPC ........... G06F 9/46; G06F 9/4843; G06F 9/505
(Continued)

(56) References Cited

U.S. PATENT DOCUMENTS 6,834,386 B1 * 12/2004 Douceur ............... G06F 9/4881
                                                          718/102

7,073,175 B2   7/2006 Rehg et al.
(Continued)

FOREIGN PATENT DOCUMENTS

CN           102508701 A      6/2012
KR    10-2005-0020942         3/2005
(Continued)

OTHER PUBLICATIONS

International Search Report and Written Opinion of the International Searching Authority for corresponding International Application No. PCT/US2014/015360, dated Jul. 16, 2014, 11 pages.
(Continued)

*Primary Examiner* — Chat C Do
*Assistant Examiner* — Bradford F Wheaton
(74) *Attorney, Agent, or Firm* — Womble Bond Dickinson (US) LLP

(57) ABSTRACT

A method and apparatus that schedules and manages a background task for device is described. In an exemplary embodiment, the device registers the background task, where the registering includes storing execution criteria for the background task. The execution criteria indicates a criterion for launching the background task and the execution criteria based on a component status of the device. The device further monitors the running state of the device for an occurrence of the execution criteria. If the execution criteria occurs, the device determines an available headroom with the device in order to perform the background task and launches the background task if the background task importance is greater than the available device headroom, where the background task importance is a measure of how important it is for the device to run the background task.

21 Claims, 9 Drawing Sheets

(58) Field of Classification Search
USPC .......................................................... 718/103
See application file for complete search history.

(56) References Cited

U.S. PATENT DOCUMENTS

| | | | |
|---|---|---|---|
| 7,451,447 B1* | 11/2008 | Deshpande | G06F 9/4812 718/102 |
| 8,028,060 B1 | 9/2011 | Wyld et al. | |
| 2003/0061260 A1* | 3/2003 | Rajkumar | G06F 9/4887 718/104 |
| 2004/0139359 A1* | 7/2004 | Samson et al. | 713/320 |
| 2008/0244584 A1 | 10/2008 | Smith et al. | |
| 2009/0019445 A1* | 1/2009 | Oswald | G06F 9/5011 718/104 |
| 2010/0095330 A1* | 4/2010 | Pal | 725/68 |
| 2011/0145761 A1* | 6/2011 | Krief | 715/810 |
| 2011/0246996 A1* | 10/2011 | Tunning | G06F 9/4881 718/103 |
| 2012/0011389 A1 | 1/2012 | Driesen et al. | |
| 2012/0209650 A1* | 8/2012 | Romagnino et al. | 705/7.15 |
| 2012/0210325 A1 | 8/2012 | de Lind van Wijngaarden et al. | |
| 2012/0226940 A1* | 9/2012 | Lin | 714/26 |
| 2013/0311995 A1* | 11/2013 | McKenney | G06F 9/524 718/102 |
| 2014/0179272 A1* | 6/2014 | Zhang et al. | 455/411 |

FOREIGN PATENT DOCUMENTS

| | | |
|---|---|---|
| KR | 10-2011-0036243 | 4/2011 |
| TW | 201216750 A | 4/2012 |
| TW | 201250600 A | 12/2012 |
| WO | WO2012024641 A2 | 2/2012 |
| WO | WO2013101289 A2 | 7/2013 |

OTHER PUBLICATIONS

Krishnamurthy et al., "Yeast: A General Purpose Event—Action System", Oct. 1, 1995, p. 845-p. 850, vol. 21, No. 10, 13 pages, XP002932236.
Bell Telephone Laboratories, Inc. "Unix Time Sharing System: Unix Programmer's Manual", Jan. 1, 1979, 403 pages, XP002237406.
PCT Chapter I International Preliminary Report on Patentability (IPRP Chapter I) PCT/US2014/015360 dated Aug. 18, 2015. (9 Pages).
Korean Office Action for Patent Application No. 10-2015-7025350 dated Jul. 7, 2016, 7 pages.
ROC (Taiwan) Patent Application No. 103104981 Search Report, dated Apr. 20, 2017, 1 page.
ROC (Taiwan) Patent Application No. 103104981 Search Report, dated Mar. 4, 2018, 2 pages.

* cited by examiner

CENTRALIZED TASK SCHEDULING

RELATED APPLICATIONS

Applicant claims the benefit of priority of prior, provisional application Ser. No. 61/765,628 filed Feb. 15, 2013, the entirety of which is incorporated by reference.

FIELD OF INVENTION

This invention relates generally to process management and more particularly to scheduling tasks based on system conditions.

BACKGROUND OF THE INVENTION

A background task is a process of a device that runs in the background and without user intervention. These background tasks can be used for processes that perform actions where a user intervention is not required. For example, a background task can be used for logging, system monitoring, device maintenance, software updates, media and/or application downloads, or other actions that do not require user intervention.

Because a background task does not require user intervention, the device can run this task on demand or can schedule to perform the background task at some future time. One way to perform the task in the future is to schedule this task is to have the task performed at a scheduled fixed time in the future. This can be can be used for a background task that is to be performed once or a recurring task that is periodically performed on a fixed time schedule.

A problem with fixed scheduling of background task execution is that the device operating conditions may not be appropriate for the background task actions. For example, a background task that periodically checks for a download availability from a server would require network connectivity with this server in order for the background task to successfully run. By scheduling this task to run at a fixed time, it is unknown if the background task will have the appropriate system conditions when device runs the background task. In addition, the running of the background task, at an inappropriate time, may degrade other running processes as well as the user interaction with the device.

SUMMARY OF THE DESCRIPTION

A method and apparatus that schedules and manages a background task for device is described. In an exemplary embodiment, the device registers the background task, where the registering includes storing execution criteria for the background task. The execution criteria indicates a criterion for launching the background task and the execution criteria based on a component status of the device. The device further monitors the running state of the device for an occurrence of the execution criteria. If the execution criteria occurs, the device determines an available headroom with the device in order to perform the background task and launches the background task if the background task importance is greater than the available device headroom, where the background task importance is a measure of how important it is for the device to run the background task.

In another embodiment, the device determines a time-dependent task importance for the background task, where the time-dependent task importance is based on a time that has elapsed since the background task is initially available to run. The device further determines an available headroom for the device in order to run the background task and compares this system cost to the time-dependent task importance. If the time-dependent task importance is greater than the available device headroom, the device runs the background task.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
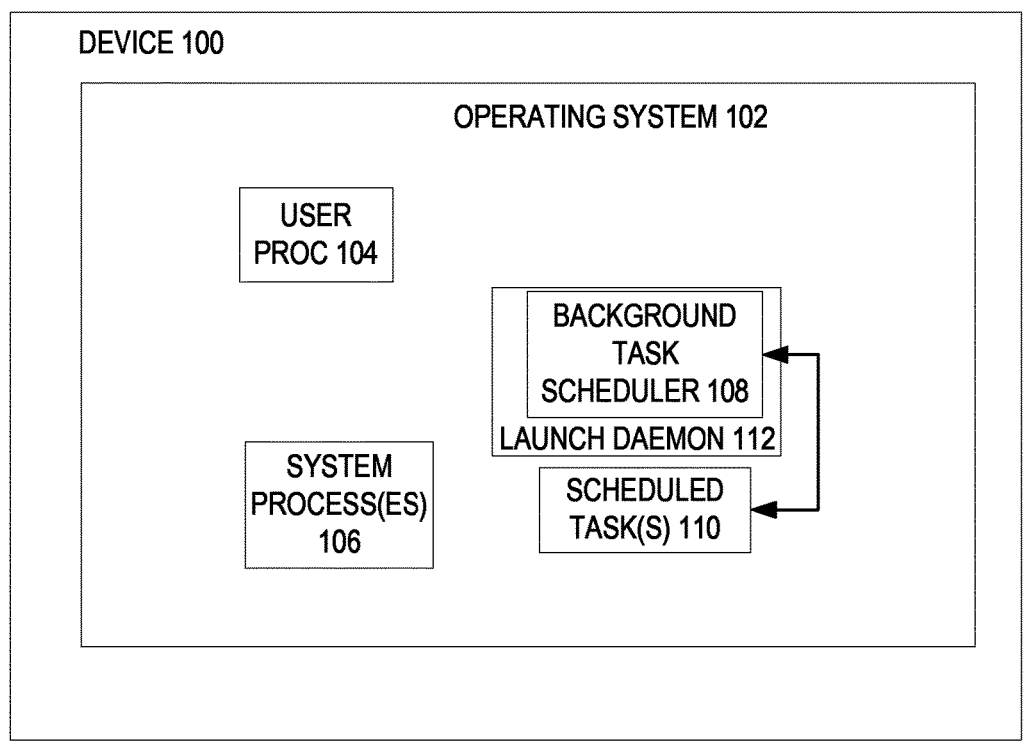
FIG. 1 is a block diagram of one embodiment of a device with background task scheduler.

A method and apparatus that schedules and manages a background task for device is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus that schedules and manages a background task for device is described. In one embodiment, the device registers a background task to be run at a later time, where this task includes one or more criteria that are used to determine when it is an appropriate time for the device to run the task. In one embodiment, each of the criteria can be based on a component status, such as device power state, central processing unit status, display status, storage system status, or network connectivity. For example and in one embodiment, a criteria can be a power status (e.g., whether the device is running on battery or is plugged into an alternative current (A/C) power source), system load (e.g., whether the central processing unit(s) (CPUs) are idle, busy, or under a certain percent load), and/or other advanced criteria (e.g., network connectivity (in general, or connected to a particular server or service), whether a screen of the device is asleep, storage activity (e.g., having the hard disk drive (HDD) spinning), requiring a particular power status (e.g., A/C only, battery at, above, below a certain threshold, etc.).

In one embodiment, if these criteria are satisfied at a time during the device operation, the device determines if the background task should be run. The device determines an available device headroom and compares this available device headroom with a task importance. In one embodiment, the available device headroom is amount of device resources that are available to run the task. If the available device headroom is greater than or equal to the task importance, the device runs the task. Conversely, if the available device headroom is lower than the task importance, the device waits for a later time to run the task. At this later time, the device re-evaluates the device conditions to determine if the task criteria are still satisfied. If the task criteria are still satisfied, the device performs the comparison of the available device headroom and the task importance. In one embodiment, the task importance changes depending on a time elapsed since the task criteria are initially satisfied. When the task criteria are initially satisfied, the task importance is low. As the time elapses, the task importance grows until the grace period of the task expires. At the expiration of the grace period for this task, the task importance increases so that the task is more likely to be run. In one embodiment, the device runs the task by sending a notification to the application corresponding to the task that the task is ready to run. In one embodiment, the task is a part of a larger application (e.g., for an e-mail application, a task could be checking for new e-mail).

Once the device runs the task, the device monitors the task criteria to determine if the task criteria are satisfied during the execution of the task. If, during execution the task, the task criteria are not satisfied, the device determines whether to continue the execution of the task. If the task is to be deferred, the device suspends the task. In one embodiment, the device suspends the task by the application corresponding to the task suspending execution of the task. At a later time, if the task criteria are subsequently re-satisfied, the device can restart execution of the task. As the task completes, the device determines if the task is a recurring task, in which case, the device schedules another instance of this task.

FIG. 1 is a block diagram of one embodiment of a device 100 with background task scheduler 108. In one embodiment, the device 100 can be a personal computer, laptop, server, mobile device (e.g., smartphone, laptop, personal digital assistant, music playing device, gaming device, etc.), network element (e.g., router, switch, gateway, etc.), and/or any device capable of executing multiple processes and having a sleep mode. In one embodiment, the device can be a physical or virtual device. In FIG. 1, the device 100 includes an operating system 102 that is a set of software used to manage the device's hardware resources and provides common services for other running the device's programs, such as application programs. In one embodiment, the operating system 102 manages the different running processes by time scheduling when a processor of the device 100 executes each running process. In one embodiment, a process is an instance of a computer program that is being executed. In this embodiment, the process may be a user application 104 that is executing as a result of user input. Examples of user processes are web surfing, word processing, email, social media, media processing, etc. Another example of a process is a system process 106 that provides one or more services to a user application, other process, etc. In one embodiment, a system process is a daemon that performs system maintenance or other types of single or recurring tasks.

In one embodiment, the operating system 102 includes a launching daemon 112 to launch processes. In this embodiment, the launch daemon includes a background task scheduler 108 that schedules and manages a background task. In addition, the operating system 102 includes one or more scheduled tasks 110. In one embodiment, a background task is a task that runs in the background and without user intervention. A background task can be a single purpose task (e.g., remote downloads, a deferrable long running activity initiated after user action or remote trigger (e.g. optimizing the storage of an on disk database (initiated after a user-triggered database update), a server-initiated (pushed) download of an update to e.g. a Uniform Resource Locator (URL) blacklist and/or whitelist, a download of a higher quality media asset (image/movie/voice) than what is shipped with the system by default (triggered on first use of the low-quality asset by the user), etc.) or can be a recurring task that periodically performs an action (e.g., backup, system maintenance, checking for software updates, mail fetches, calendar refresh, downloading of system and/or as 3rd-party application updates (in addition to checking for the presence of such updates on a server), synchronizing of user documents and/or settings with a server, uploading of diagnostic information about the device and/or applications on the device to a server, etc.). In one embodiment, the background task scheduler 108 schedules a task to run at a time when the system conditions are appropriate for the scheduled task to run. In one embodiment, the background task scheduler 108 receives a message for a task to be scheduled to run from an application that corresponds to this task. In one embodiment, the task is a part of a larger application (e.g., for an e-mail application, a task could be checking for new e-mail). For example and in one embodiment, a software update daemon registers a check for updates task with the background task scheduler 108, where the check for updates task is a task that checks to see if there are updates that are available to download and install on the device 100. As another example and in another embodiment, a backup service application registers a backup maintenance task with the background task scheduler 108.

In one embodiment, by running the tasks based on system conditions, the background task scheduler 108 can improve battery life, device responsiveness, eliminate the cost of starting services that immediately exit due to unsatisfied requirements, and centralize the logic for the device 100 wake/nap power management tasks with the background task scheduler 108. In this embodiment, the background task scheduler 108 registers a task based on a request from another process, such as the user process 104 or system process 106. In one embodiment, the task may be repeating or non-repeating. The task may be registered dynamically by an application, or statically based on a configuration of a system process 106. In one embodiment, each task has a dictionary describing the task execution criteria (e.g., various considerations the system should take into account when decided whether to run the task), a current execution state (is it running or not) and a handler that is invoked when the task's state changes.

In one embodiment, the application registers a task with an application plugin that is used to communicate with the background task scheduler 108. In addition, once the task criteria are satisfied and it is an appropriate time for the task to be run, the background task scheduler 108 sends a notification to the application that the task may be run using an inter-process communication message (e.g., inter-process communication (IPC) messages, Mach messages, signals, writes to a file descriptor, creation of a "semaphore" file, etc.). In one embodiment, the background task scheduler 108 sends a notification to wake up a sleeping application in response to a registered task. This embodiment allows applications in a sleep mode to be automatically woken up to respond to registered task. Furthermore, this embodiment also allows system process(es) 106 (e.g., daemons) to be launched on demand in response to registered task. In another embodiment, daemons participate in idle exit and successfully idle exit while tasks are waiting to run. In this embodiment, the daemon will be automatically re-launched in response to the task becoming runnable.

In one embodiment, once a task is registered, the background task scheduler 108 runs this task based on a number of possible criteria. In one embodiment, the different criteria can be: repeatability, delay, grace period, and priority. In one embodiment, repeatability is whether the task is to be rescheduled automatically when it completes. Delay is a period of time to wait before starting the task. In one embodiment, the task is one of the execution criterion for the task. In this embodiment, if the delay is not satisfied, the other execution criteria will not be checked for satisfaction. The grace period is a period of time after which the task becomes past due and the system tries to schedule the task more aggressively. In addition, the background task scheduler 108 can use different priority criteria to run the task. In one embodiment, the different priorities can be for a maintenance task, which are used for user-invisible tasks and avoids running on battery until the task is past due, and a utility task, which is used for user-visible tasks and may run on battery. In one embodiment, a background task can be run in a reduced power-consumption mode.

By using the different criteria and priority, the background task scheduler 108 evaluates each task's criteria to determine whether the task is eligible to run. In one embodiment, the background task scheduler 108 will tend to execute tasks when on A/C power instead of battery and tends to execute tasks during a power nap instead of when awake, and tends to execute tasks when the system is idle instead of busy. In one embodiment, a power nap is a sleep mode that allows the device 100 to perform tasks silently, such as media syncing and search indexing. In this embodiment, low energy tasks are performed when on battery power, while higher energy tasks are performed with A/C power. A power nap can apply to the device or to one or more individual applications.

In one embodiment, different types of tasks can have different types of criteria for when the task is available to run. For example and in one embodiment, a maintenance eligible task can run during an A/C power nap and A/C Idle during the nominal time period, and can run during A/C power nap, A/C Idle, A/C Busy, Battery power nap, Battery Idle, and Battery Busy if the task is past due. In this embodiment, Busy and Idle refer to the system load, Battery and A/C refer to whether the device 100 is using the device 100 battery for power or is plugged in and using A/C power. Power nap refers to the device 100 being in a power nap sleep mode. In another example and an another embodiment, a utility task can run during an A/C power nap, A/C Idle, and Battery Idle during the nominal time period, and can run during A/C power nap, A/C Idle, A/C Busy, Battery power nap, Battery power nap, Battery Idle, and Battery Busy if the task is past due.

In one embodiment, in addition to the criteria described above, the background task scheduler 108 can use advanced criteria to determine when to run the registered task. In one embodiment, these advanced criteria can be used by themselves or can be used in addition to the general sleep mode, power, and system load criteria described above. In one embodiment, the advanced criteria are: network criteria, A/C only, Screen Sleep, Battery Level, Hard Disk Drive (HDD) spinning, power nap eligibility, type of networking (wireless (Wi-Fi or cellular), wired, etc.) networking in roaming state, cellular voice calls available, etc. In one embodiment, the network criterion is used for tasks that may require connectivity to a specified host or general network connectivity in order to be eligible. The requested connection will be attempted prior to initiating such task. The established connection may be retrieved from the task (e.g., the communication handle may be stored in the task dictionary). The A/C only criteria can be used for tasks that may require A/C power, even when past due. The Screen Sleep criteria can be used for tasks that may require screen sleep. The Battery Level criterion is used for tasks that may require a minimum battery level (%). For example and in one embodiment, a download task may require a high battery percentage level (e.g., >90%) and a status check may require a smaller battery percentage level (e.g., >25%). In one embodiment, the HDD spinning criteria can be used for tasks that require the HDD be spinning.

In one embodiment, once the criteria for a registered task is satisfied, the background task scheduler 108 compares an importance of the registered task with an available headroom for the device. In one embodiment, the available device headroom is amount of device resources that are available to run the task. In this embodiment, the available device headroom is determined based one or more different factors that measure what type of load or use the device is experiencing. For example and in one embodiment, the available device headroom can be based on device temperature, CPU % utilization, whether the device is running on battery or AC, battery capacity, memory usage, user activity (e.g. how recently has the user been actively interacting with the device), another type of factor that measures current device capacity or load, and/or a combination thereof. In one embodiment, the device headroom is based on a function of the one or more factors. For example and in one embodiment, if one of the factors is above a threshold for that factor, then the available device headroom is small. In another example, a polynomial of the values for one or more of the factors can be used to determine the available device headroom (e.g., a square root of the sum of the squares of factors with each of the factor normalized to be between zero and one).

In one embodiment, each registered task has the following states: CHECK-IN, WAIT, RUN, DEFER, CONTINUE, DONE. In one embodiment, the CHECK-IN state is an optional state that is used by daemons to check in with the background task scheduler 108. In one embodiment, a task whose criteria have not yet been satisfied is in the WAIT state. This state is used for a task that is waiting for the system criteria to be satisfied before the task is run. In one embodiment, once the task's criteria are satisfied, the background task scheduler 108 transitions the task to the RUN state and invokes the handler for the task. During the course of the RUN, the application may test whether the criteria for the task are still satisfied. The application may then optionally return early from the handler and defer the work to a more opportune time by putting the task in the DEFER state. For example and in one embodiment, the background task scheduler 108 observes the impact of actually executing the task on system load and take that information into account in future decision about whether to run that task again, or even whether to stop the currently running task and defer it. For instance, on a laptop in a backpack, the thermal impact of running a task in powernap may be too high so it may need to be stopped prematurely, but if that same sleeping laptop is sitting on a desk, that same task in powernap may be just fine.

The background task scheduler 108 can re-invoke the handler when the criteria for the task are once again satisfied. Alternatively, the application may request to continue the work asynchronously from the handler by setting the state to the CONTINUE state, in which case, the background task scheduler 108 must update the state to either DEFER or DONE at a later time. Finally, an application may indicate that the task is DONE. A non-repeating task will be unregistered with the background task scheduler 108 once the task is done and a repeating task is re-registered with the background task scheduler 108 so that this task can be repeated at the scheduled time.

Figure 2:
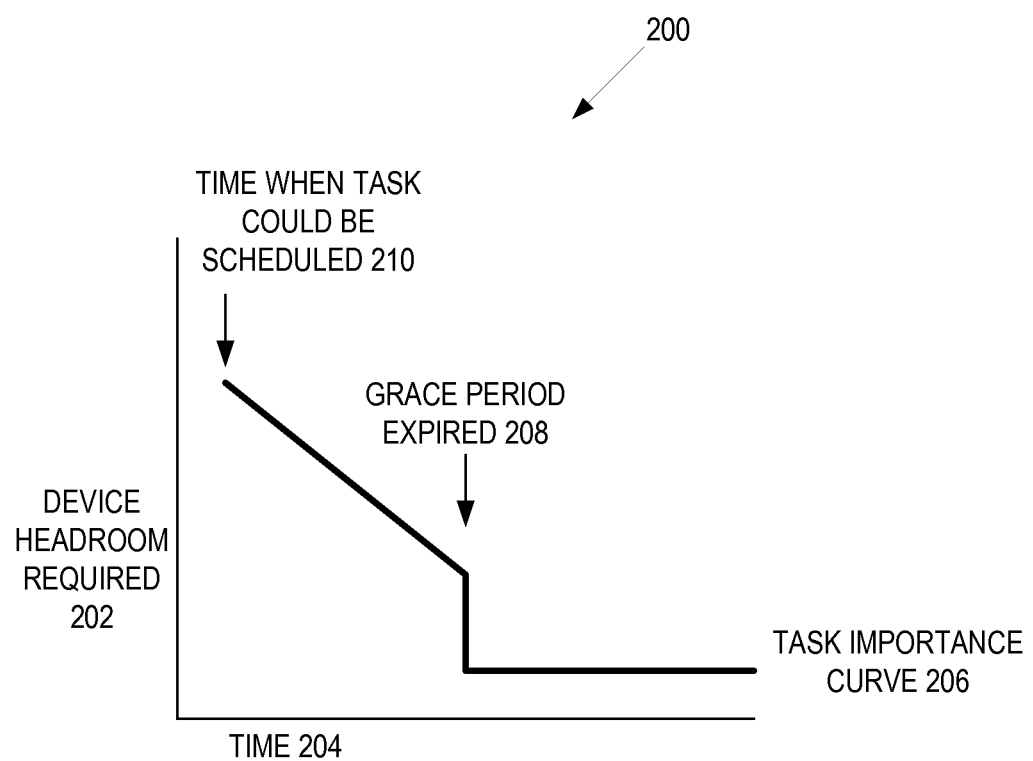
FIG. 2 is an illustration of one embodiment of a task importance curve.

As described above, once the task criteria for a task have been satisfied, the device 100 uses a task importance curve to determine whether to run the task. FIG. 2 is an illustration of one embodiment of a task importance curve 206 for one task. In one embodiment, the task importance curve is representative of one task and other tasks may have differently shaped tasks (e.g., shorter or longer grace periods, non-linear curves or a linear curve with a larger or smaller slope between the initial scheduled point and the point at which the grace period expires, etc.) In one embodiment, the task importance curve 206 is a curve plotted of device headroom required 202 versus time 204 for one task that is registered with the background task scheduler 108. In one embodiment, if the device headroom is below or equal to the task importance curve 206 for a given point of time, the background task scheduler 108 defers running the task. If required device headroom is at or above the task importance curve 206 at a particular point in time, the background task scheduler 108 runs the task. In one embodiment, the task importance curve 206 decreases in device headroom required 202 as time increases for the time 204. Thus, the task importance is time-dependent because the value of the task importance changes over time, including a time before the grace period expires. In this embodiment, the task importance curve 206 is at the highest point 210 when the task can initially be scheduled for running. By being at a high point, this means that the task can run if the available device headroom is high. In one embodiment, as the time increases since the initial point 210, the task importance lowers on the task importance curve 206 as time increases. In this embodiment, as time increases since the initial point that the task can be run, the background task scheduler 108 can allow a task to run with a smaller available device headroom. This gradual decrease in cost threshold ends when the grace period 208 of the task ends. In one embodiment, each task has a grace period. During this grace period, the task can be run in which the conditions are more optimal for the task to run. In one embodiment, once the grace period expires, a lower required device headroom can occur for the task to be run. This allows the task to run in a greater variety of scenarios. For example and in one embodiment, a task that is to run during a time of high system utilization will be deferred until a time when the importance of the task has increased to a point where the task can be run. In one embodiment, after the grace period ends, the task remains in the "urgent state" until such a time that the task can be run. In this embodiment, the task may not run because the device is very busy and has no headroom to run the task. In one embodiment, after the grace period, the required device headroom for the task can be a constant value that is non-zero or zero. If non-zero, this means that a condition can exist where the task is not run (e.g., if the temperature of the device is high, then the task is not run). In another embodiment, the section of the task importance curve 206 is non-constant (e.g., asymptotically trending towards zero).

Figure 3:
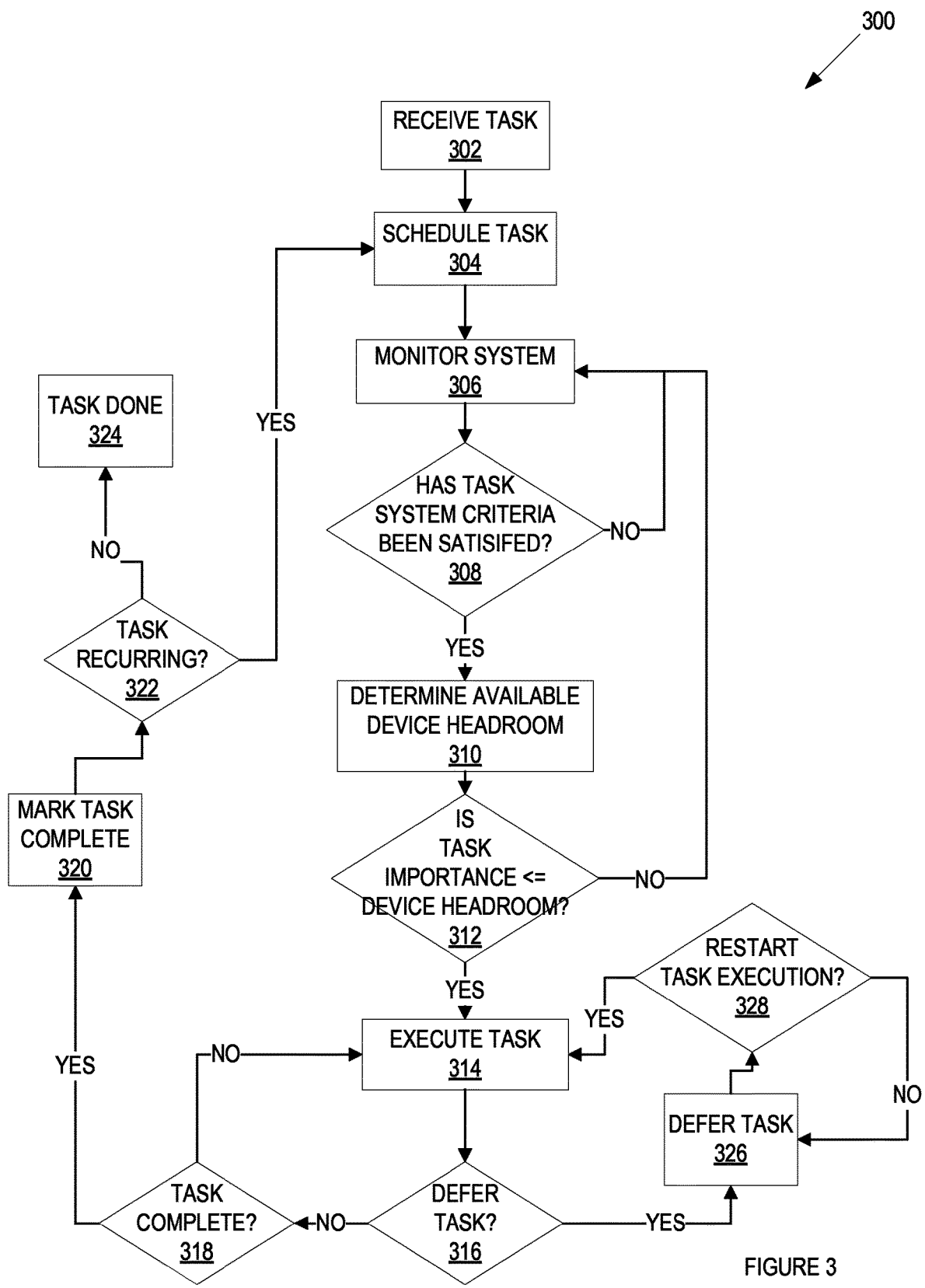
FIG. 3 is a flow chart of one embodiment of a process to schedule and manage a task.

As described above, the background task scheduler 108 of device 100 schedules the tasks, determines when to run the task, and manages the running of the task. FIG. 3 is a flow chart of one embodiment of a process 300 to schedule and manage a task. In one embodiment, process 300 is performed by the background task scheduler to schedule and manage task, such as background task scheduler 108 of FIG. 1 as described above. In FIG. 3, process 300 begins by receiving the task that is to be scheduled at block 302. In one embodiment, process 300 receives the task to be scheduled from a user process, a system process, via a static configuration file (e.g., launch-on-demand tasks), etc. For example and in one embodiment, user process can be a media management application that uses a task to determine if there is available media to download for the user, a mail application that can use a task to fetch mail, a calendar application to refresh a calendar, etc. As another example, a system process can be a search system that uses a task to update a search index, a backup application that uses a task to perform backup maintenance work, a file viewing application that uses a task to update the file cache, a software update program can use a task to check for available updater, an application store application can use a task to determine is there are application downloads and/or updates, etc. Process 300 schedules the task at block 304. In one embodiment, process 300 schedules the task using one or more criteria of when the task can run. In one embodiment, these execution criteria are stored in the dictionary for the scheduled task. For example and in one embodiment, a maintenance type task can be scheduled to possibly run before the grace period ends for this task when the system running the task has A/C power and the system is idle or in a power nap. In this embodiment, after the grace period ends, the maintenance type task can be run when the system is either on A/C power or on battery power. In this embodiment, the maintenance type task after the grace period expires for this when the criteria of A/C Power Nap, A/C Idle, A/C Busy, Battery Power Nap, Battery Power Nap, Battery Idle, and Battery Busy are satisfied. In one embodiment, a grace period is a period of time after which the task becomes past due and the system tries to schedule the task more aggressively At block 306, process 300 monitors the system to determine if the criteria for the scheduled task have been satisfied. In one embodiment, process 300 monitors the power state of the system (e.g., on A/C power or battery) and/or system load (e.g., idle, busy, or in a Power Nap). In addition, process 300 can monitor advanced criteria conditions, such as network criteria, A/C only, Screen Sleep, Battery Level, Hard Disk Drive (HDD) spinning, etc. Process 300 determines if task criteria have been satisfied at block 308. In one embodiment, process 300 determines that a task's execution criteria are satisfied by setting up system change notifications for the overall set of conditions underlying the execution criteria for each of the currently registered tasks, and evaluating each task's set of execution criteria when the system notifies process 300 that an underlying system condition for one of the monitored criteria has changed. In one embodiment, a task whose criteria have not yet been satisfied is in the WAIT state. This state is used for a task that is waiting for the system criteria to be satisfied before the task is run.

If the task criteria have not been satisfied, execution proceeds to block 306 above. If the task criteria have been satisfied, process 300 determines the available device headroom at block 310. In one embodiment, process 300 determines the available device headroom by evaluating one or more factors of the device as described above with reference to FIG. 1. At block 312, process 300 determines if the task importance for the task is less than (or equal to) the system cost for the task. In one embodiment, process 300 computes the task importance based on the task importance curve and the time elapsed since the criteria for the task are first satisfied. Determining if the task importance is less than (or equal to) the available device headroom is further described in FIG. 5 below. If the task importance is not less than the available device headroom, execution proceeds to block 306 above.

If the task importance is less than (or equal to) than the available device headroom, process 300 executes the task at block 314. In one embodiment, process 300 notifies the application corresponding to the task that the task is ready for execution. In one embodiment, once the task's criteria are satisfied, the process 300 transitions the task to the RUN state and invokes the handler for the task. For example and in one embodiment, if the criteria for a media download check task for a media management application are satisfied and this task is ready to run, process 300 sends a notification to the application that the task is ready to run. In this embodiment, process 300 does not directly invokes the handler or "runs the task". Process 300 sends a message to the application or daemon that registered for a task to trigger the task's handler execution. For an on-demand-launchable or idle-exiting daemon, this message will also first launch the daemon in question.

At block 316, the application or daemon for the task determines if the task should be deferred. In one embodiment, while the task is being run, the application running the task may test whether the criteria for the task are still satisfied. The application may then return early from the handler and DEFER the work to a more opportune time. If the task is to be deferred, at block 326, the application or daemon for the task defers the running of the task and puts the task into the DEFER state. In one embodiment, in this state, the task is suspended in its current state. At block 328, process 300 determines if the task execution should be restarted. If the task execution should be restarted, execution proceeds to block 314 above. In one embodiment, process 300 can notify the application or daemon for this task that the handler can be re-invoked when the criteria for the task are once again satisfied. Alternatively, the application may request to CONTINUE the work asynchronously from the handler, in which case, the application or daemon for the task updates the state of the task to either DEFER or DONE at a later time. If the task execution is not to be restarted, execution proceeds to block 326 above.

If the task execution is not to be deferred at block 316 above, the application or daemon for the task determines if the task has completed at block 318. At block 320, process 300 marks the task as completed. In one embodiment, process 300 puts the task is the DONE state if the task is completed. At block 322, process 300 determines if the task is a recurring task. In one embodiment, a recurring task is one that is periodically executed to perform a repeated scheduled server. For example and in one embodiment, a recurring task can be one that periodically checks for a download from a server (e.g., mail fetching, calendar refresh, media download service, application download, etc.). In this embodiment, once the download task is complete, process 300 would schedule another instance of this task for execution in the future. If the task is a recurring task, execution proceeds to block 304, where process 300 schedules the next instance of the task. If the task is not a recurring task, at block 324, process 300 marks the execution of the task as done.

Figure 4:
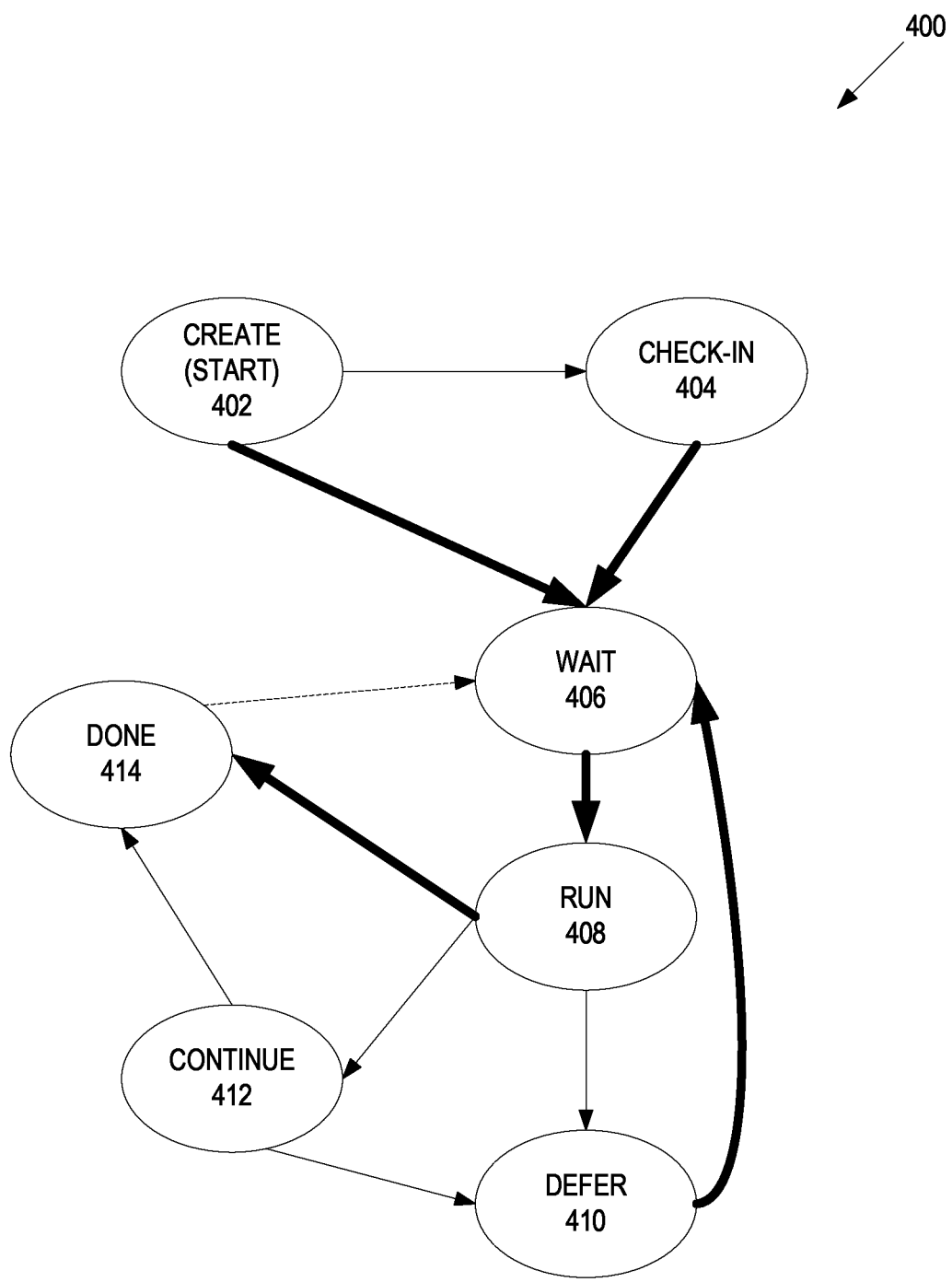
FIG. 4 is an illustration of one embodiment of a state diagram of different states for a task.

FIG. 4 is an illustration of one embodiment of a state diagram 400 of different states for a task. In one embodiment, the background task scheduler 108 and/or the application handling the task updates the state of the task according to this state diagram 400. The state diagram 400 illustrates the supported state transitions. In one embodiment, the solid lines indicate state advancements made by the system upon return from the handler. Manual advancement of the state by the application is optional and applies to the DEFER, CONTINUE and DONE states. The bold dotted line applies to repeating tasks. The thin lines indicate optional state advancements by the application " . . . applies to the DEFER, CONTINUE and CHECK-IN states".

In one embodiment, each registered task starts by being created by either an application or daemon, or by a scheduler based on a static configure file. In one embodiment, each registered task has the following states: CREATE/START 402, CHECK-IN 404, WAIT 406, RUN 408, DEFER 410, CONTINUE 412, and DONE 414. In one embodiment, the CHECK-IN state 404 is an optional state that is used by daemons to check in with the background task scheduler 108. In one embodiment, the CHECK-IN state is used by on-demand-launched daemons to retrieve and potentially modify eligibility criteria specified in static configuration files. The state advances to WAIT automatically upon return of the handler for the CHECK-IN state. In another embodiment, the background task scheduler transitions a task form the CREATE/START state 402 by advancing from CREATE to WAIT automatically and remains there until the activity is eligible to run (at which point the state advances to RUN).

In one embodiment, a task whose criteria have not yet been satisfied is in the WAIT state 406. This state is used for a task that is waiting for the system criteria to be satisfied before the task is run. For example and in one embodiment, a maintenance task that requires a screen sleep will not be able to run until the screen of the device that will run the ask is asleep. In one embodiment, once the task's criteria are satisfied, the background task scheduler transitions the task to the RUN state 408 and invokes the handler for the task. In one embodiment, the handler of an application is a block of code that is to be run to initiate the task and perform the task operations.

In one embodiment, during the course of the task being in the RUN state 408, the application may test whether the criteria for the task are still satisfied. For example and in one embodiment, if a task depends on a network connection to a particular service and this service is not currently available, the application that corresponds to this task transitions the task state to DEFER 410. In one embodiment, the task (e.g., the application) may query the scheduler to test if it should defer execution. If the response is yes, the application may acknowledge the deferral by setting the task state to DEFER (otherwise the task remains in the RUN state, or moves to the DONE state if the handler returns without changing the state). In one embodiment, if the criteria are not currently satisfied for the running task, the application may then return from the handler and defer the work to a time when the criteria task are satisfied. In one embodiment, the background task scheduler 108 will re-invoke the handler when the criteria for the task are once again satisfied. Alternatively, the application may request to CONTINUE 412 the work asynchronously from the handler, in which case, the background task scheduler updates the state to either DEFER 410 or DONE 414 at a later time. In one embodiment, the CONTINUE state is used if the "running" of the task needs to continue after the handler returns for the RUN state, where the automatic state transition from RUN to DONE is not to occur. If the state is set to CONTINUE the task is considered to be "running" until the application manually sets the state to either DONE or DEFER.

In one embodiment, an application may indicate that the task is done by putting the task in the DONE state 414. In this embodiment, a non-repeating task is unregistered with the background task scheduler once the task is done and repeating task is re-registered with the background task scheduler so that this task can be repeated at the scheduled time. In one embodiment, the transition to DONE also occurs automatically when the handler returns (after being called by the transition to the RUN state) without having changed the state.

Figure 5:
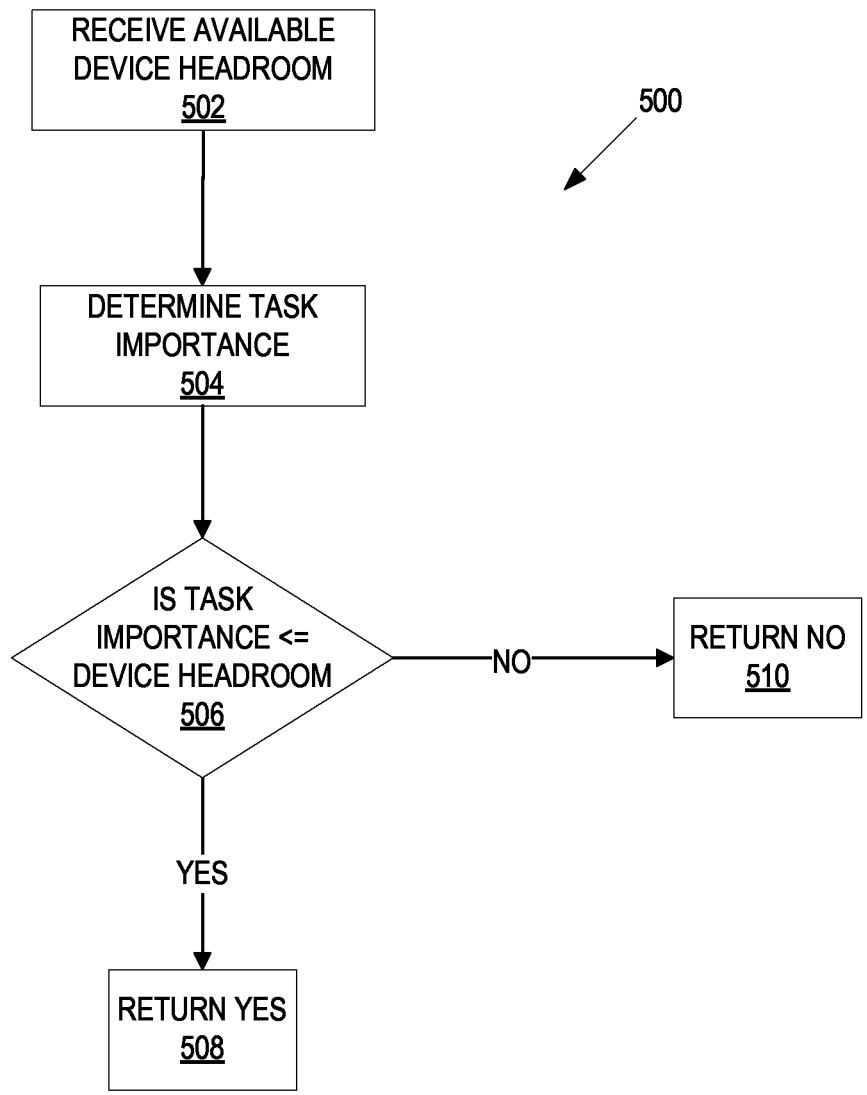
FIG. 5 is a flowchart of one embodiment of a process to compare a task importance and an available device headroom.

As described above, the background task scheduler may not automatically run the task if the execution criteria for a task are satisfied. Instead the background task scheduler compares the task importance with the available device headroom to determine whether to run the task. FIG. 5 is a flowchart of one embodiment of a process 500 to compare a task importance and an available device headroom. In one embodiment, process 500 is performed by process 300 at block 312 in FIG. 3 above to compare a task importance and an available device headroom. In FIG. 5, process 500 begins by receiving the available device headroom at block 502. In one embodiment, the available device headroom is determined by evaluating one or more factors of the device as described above with reference to FIG. 1. At block 504, process 500 determines the task importance. In one embodiment, process 500 determines the task importance by using the task importance curve, such as the task importance curve 206 as described in FIG. 2 above. In this embodiment, process 500 determines the time elapsed since the criteria of the task were initially satisfied. Using this time, process 500 can determine the task importance using the elapsed time with the task importance curve as described above with reference to FIG. 2. For example and in one embodiment, the task importance is relatively low at the initial point at which the task criteria are satisfied. This task importance grows up until the grace period expires for this task. At this point, the task importance jumps up because the background task scheduler will more aggressively try to run the task. In another embodiment, process 500 computes the task importance using an equation that relates the task importance based on the time elapsed since the task criteria were initially satisfied.

At block 506, process 500 determines if the task importance of the task is less than (or equal to) the available device headroom. If the task importance is less than (or equal to) the available device headroom, the system can run the task and returns a yes at block 508. If not, the system defers execution of the task until a later time and returns a no at block 510.

Figure 6:
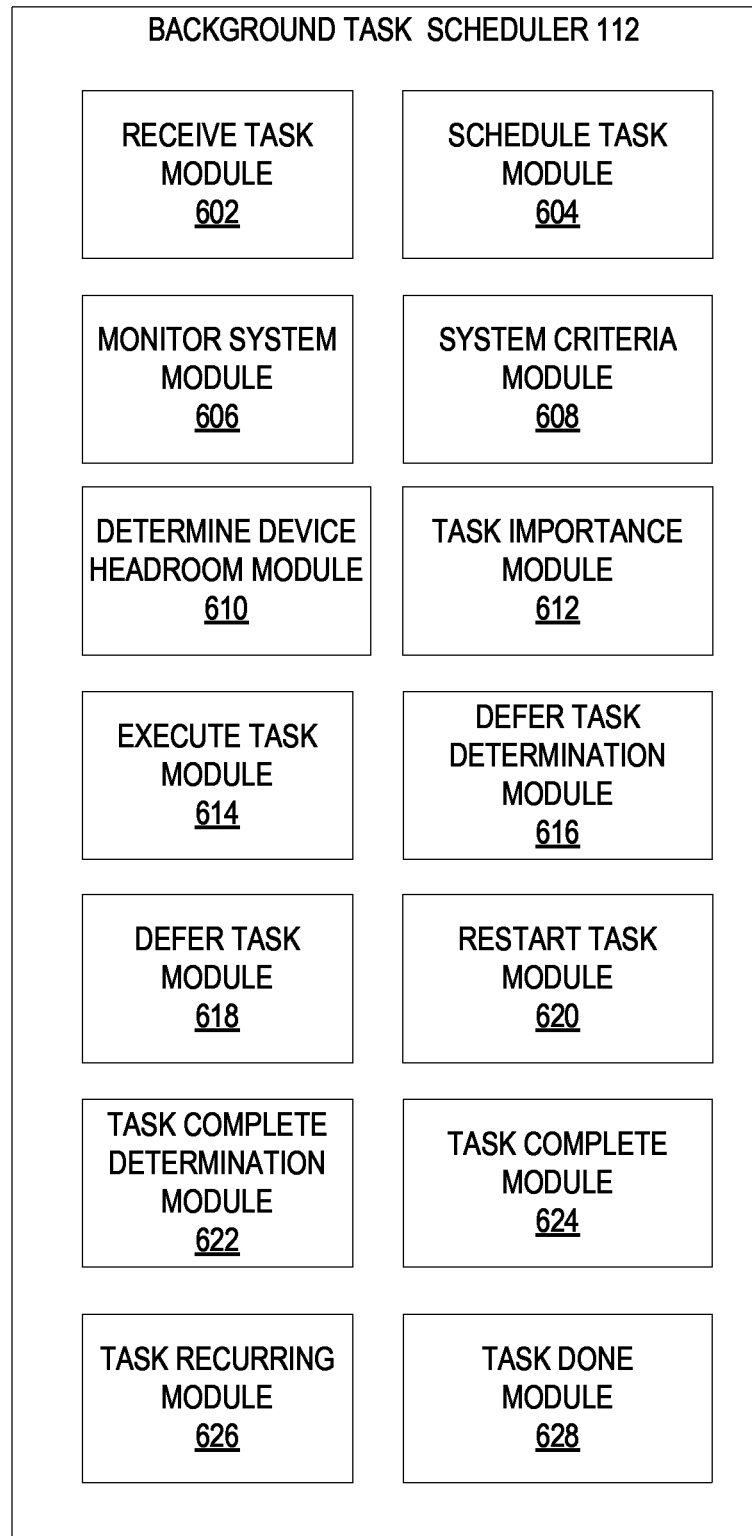
FIG. 6 is a block diagram of one embodiment of a background task scheduler to schedule and manage a task.

FIG. 6 is a block diagram of one embodiment of a background task scheduler 108 to schedule and manage a task. In one embodiment, the background task scheduler 108 includes receive task module 602, schedule task module 604, monitor system module 606, system criteria module 608, determine available device headroom module 610, task importance module 612, execute task module 614, defer task determination module 616, defer task module 618, restart task module 620, task complete determination module 622, task complete module 624, task recurring module 626, and task done module 628. In one embodiment, the receive task module 602 receives the task as described in FIG. 3, block 302 above. The schedule task module 604 schedules the task as described in FIG. 3, block 304 above. The monitor system module 606 monitors the system for the task criteria as described in FIG. 3, block 306 above. The system criteria module 608 determines if the criteria for the task are satisfied as described in FIG. 3, block 308 above. The determine available device headroom module 610 determines the available device headroom as described in FIG. 3, block 310 above. The task importance module 612 compares the task importance and system cost as described in FIG. 3, block 312 above. The execute task module 614 runs the task as described in FIG. 3, block 314 above. The defer task determination module 616 determines whether to defer the task as described in FIG. 3, block 316 above. The defer task module 618 defers execution of the task as described in FIG. 3, block 326 above. The restart task module 620 restarts execution of the task as described in FIG. 3, block 328 above. The task complete determination module 622 determines if the task execution is complete as described in FIG. 3, block 318 above. The task complete module 624 marks the task as complete as described in FIG. 3, block 320 above. The task recurring module 626 determines if the task is recurring as described in FIG. 3, block 322 above. The task done module 628 marks the execution of the task as done as described in FIG. 3, block 324 above.

Figure 7:
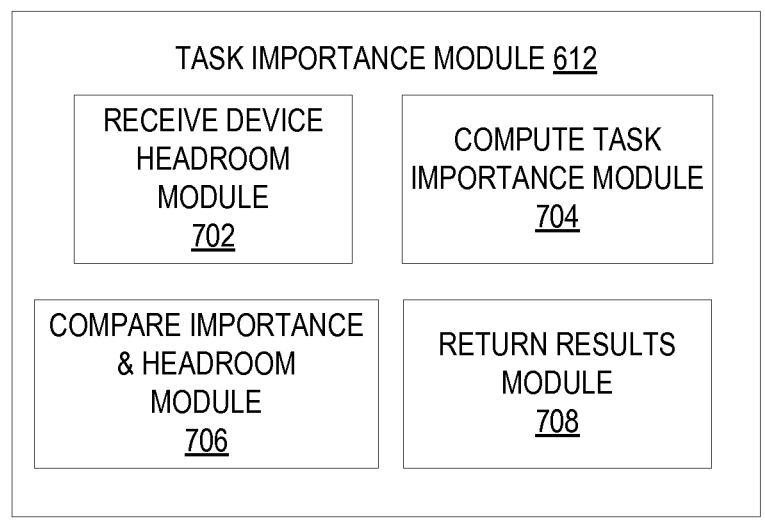
FIG. 7 is a block diagram of one embodiment of a task importance module to compare a task importance and an available device headroom.

FIG. 7 is a block diagram of one embodiment of a task importance module 612 to compare a task importance and an available device headroom. In one embodiment, the task importance module 612 includes a receive available device headroom module 702, compute task importance module 704, compare importance and headroom module 706, and return results module 708. In one embodiment, the receive available device headroom module 702 receives the available device headroom as described in FIG. 5, block 502. The compute task importance module 704 determines the task importance as described in FIG. 5, block 504. The compare importance and headroom module 706 determines if the task importance is greater than the system cost of the task as described in FIG. 5, block 506. The return results module 708 returns the results of the comparison as described in blocks 508 and 510 of FIG. 5 above.

Figure 8:
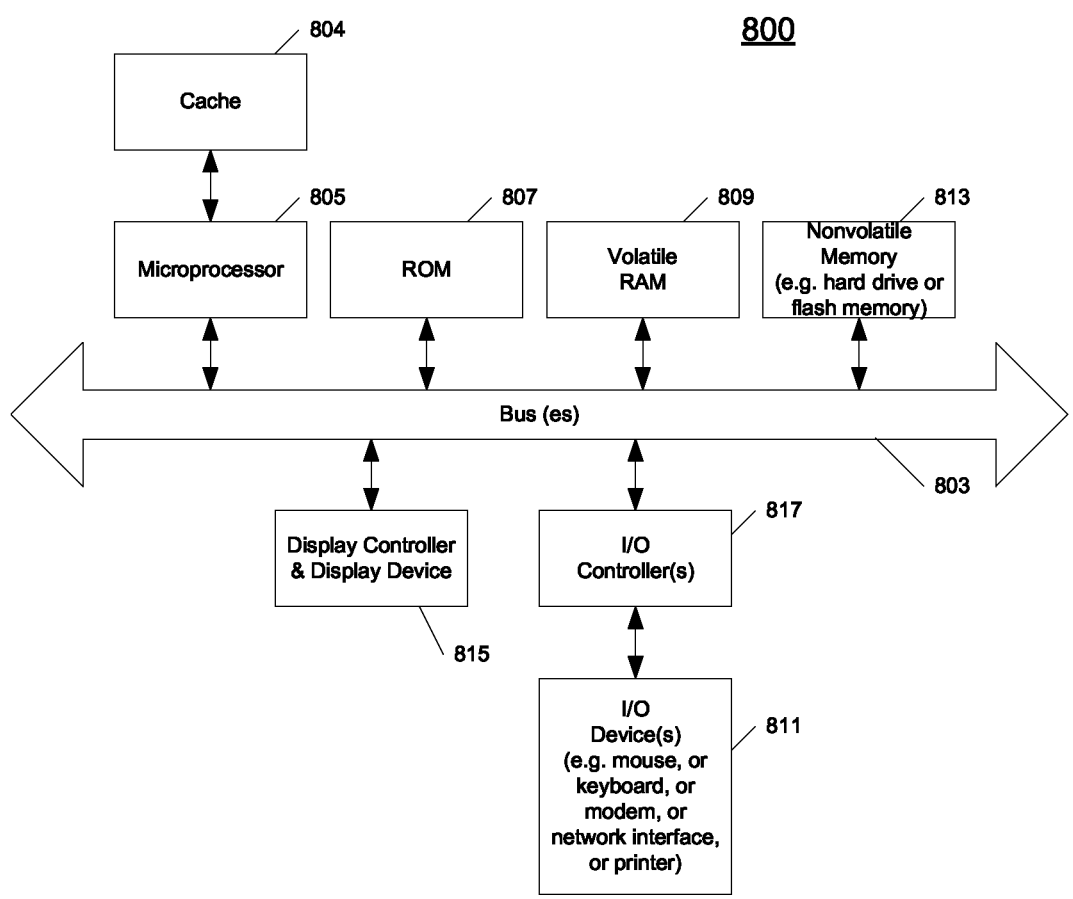
FIG. 8 illustrates one example of a typical computer system, which may be used in conjunction with the embodiments described herein.

FIG. 8 shows one example of a data processing system 800, which may be used with one embodiment of the present invention. For example, the system 800 may be implemented including a device 100 as shown in FIG. 1. Note that while FIG. 8 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 813 and to peripheral devices such as input/output (I/O) devices which may be mice, keyboards, modems, network interfaces, printers and other devices which are well known in the art. Typically, the input/output devices 815 are coupled to the system through input/output controllers 813. The volatile RAM (Random Access Memory) 809 is typically implemented as dynamic RAM (DRAM), which requires power continually in order to refresh or maintain the data in the memory.

The mass storage 811 is typically a magnetic hard drive or a magnetic optical drive or an optical drive or a DVD RAM or a flash memory or other types of memory systems, which maintain data (e.g. large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Figure 9:
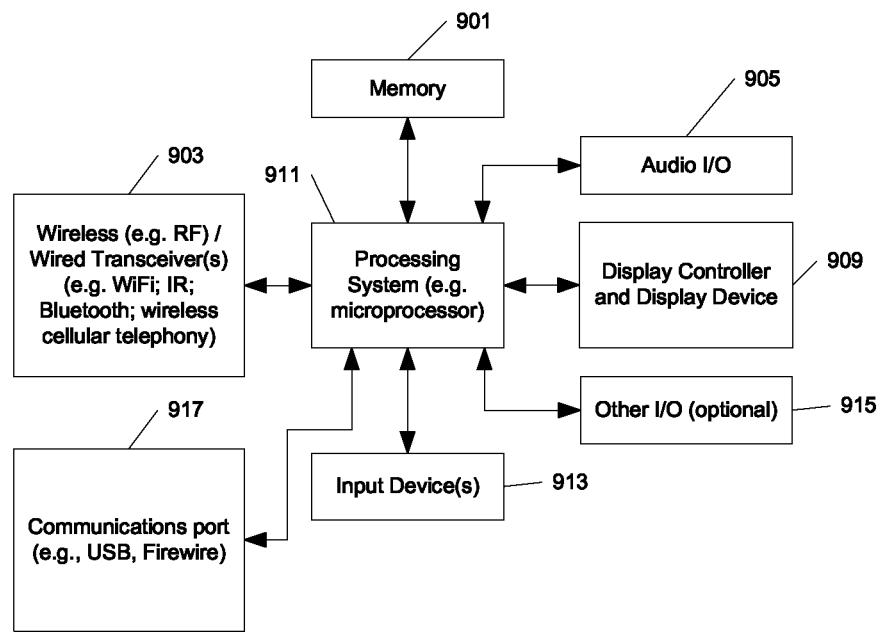
FIG. 9 shows an example of a data processing system, which may be used with one embodiment of the present invention.

FIG. 9 shows an example of another data processing system 900 which may be used with one embodiment of the present invention. For example, system 900 may be implemented as a device 100 as shown in FIG. 1. The data processing system 900 shown in FIG. 9 includes a processing system 911, which may be one or more microprocessors, or which may be a system on a chip integrated circuit, and the system also includes memory 901 for storing data and programs for execution by the processing system. The system 900 also includes an audio input/output subsystem 905, which may include a microphone and a speaker for, for example, playing back music or providing telephone functionality through the speaker and microphone.

A display controller and display device 909 provide a visual user interface for the user; this digital interface may include a graphical user interface which is similar to that shown on a Macintosh computer when running OS X operating system software, or Apple iPhone when running the iOS operating system, etc. The system 900 also includes one or more wireless transceivers 903 to communicate with another data processing system, such as the system 900 of FIG. 9. A wireless transceiver may be a WLAN transceiver, an infrared transceiver, a Bluetooth transceiver, and/or a wireless cellular telephony transceiver. It will be appreciated that additional components, not shown, may also be part of the system 900 in certain embodiments, and in certain embodiments fewer components than shown in FIG. 9 may also be used in a data processing system. The system 900 further includes one or more communications ports 917 to communicate with another data processing system, such as the system 800 of FIG. 8. The communications port may be a USB port, Firewire port, Bluetooth interface, etc.

The data processing system 900 also includes one or more input devices 913, which are provided to allow a user to provide input to the system. These input devices may be a keypad or a keyboard or a touch panel or a multi touch panel. The data processing system 900 also includes an optional input/output device 915 which may be a connector for a dock. It will be appreciated that one or more buses, not shown, may be used to interconnect the various components as is well known in the art. The data processing system shown in FIG. 9 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 900 may be a network computer or an embedded processing device within another device, or other types of data processing systems, which have fewer components or perhaps more components than that shown in FIG. 9.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "registering," "receiving," "determining," "resuming," "storing," "monitoring," "computing," "launching," "deferring," "forwarding," "rescheduling," "marking," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to schedule a background task for a device, the method comprising:
  receiving an execution criteria for a background task for a device, the execution criteria indicates one or more criteria for launching the background task and the execution criteria based on a component status of the device;
  monitoring a running state of the device for an occurrence of the execution criteria;
  determining an available device headroom to run the background task, when the execution criteria occurs; and
  requesting a launch of the background task based on a comparison of the available device headroom and a background task importance and the background task importance is a measure of how important it is for the device to run the background task and the background task importance changes to have a plurality of different values during a grace period that occurs after the executing criteria occurs and prior to the requesting of the launch of the background task, wherein the background task is executed by a processing unit of the device after being launched.

2. The non-transitory machine-readable medium of claim 1, wherein the component status is selected from the group comprising device power state, central processing unit status, display status, storage system status, and network connectivity.

3. The non-transitory machine-readable medium of claim 2, wherein the device power state is selected from the group comprising idle, busy, and percentage level.

4. The non-transitory machine-readable medium of claim 2, wherein the central processing unit status is selected from the group comprising busy, idle, and percentage threshold.

5. The non-transitory machine-readable medium of claim 1, wherein the execution criteria is a combination of a plurality of component statuses.

6. The non-transitory machine-readable medium of claim 1, wherein the background task importance is time dependent and based on a time elapsed since the execution criteria occurs.

7. The non-transitory machine-readable medium of claim 1, further comprising:
if the execution criteria is no longer met,
deferring execution the background task.

8. The non-transitory machine-readable medium of claim 1, further comprising:
determining the background task has completed execution; and
if the background task is a recurring task,
rescheduling the background task to execute at a future time.

9. The non-transitory machine-readable medium of claim 1, wherein the background task is a task performed by an application without user intervention.

10. The non-transitory machine-readable medium of claim 9, wherein the launching of the background task comprises:
invoking a handler that corresponds to the background task.

11. A non-transitory machine-readable medium having executable instructions to cause one or more processing units to perform a method to schedule a background task for a device, the method comprising:
determining a time-dependent task importance for the background task, where the time-dependent task importance changes to have a plurality of different values during a grace period that occurs after the background task is initially available to run and prior to launching the background task, wherein the background task is executed by a processing unit of the device after being launched;
determining an available device headroom to run the background task; and
requesting a launch the background task based on at least a comparison of the available device headroom and a background task importance.

12. The non-transitory machine-readable medium of claim 11, wherein the time-dependent task importance increases before a grace period for the background task expires.

13. The non-transitory machine-readable medium of claim 12, wherein the grace period for the background task is a time period for the background task, after which, the device more aggressively schedules the background task for running.

14. A method to schedule a background task for a device, the method comprising:
receiving an execution criteria for a background task, the execution criteria indicates one or more criteria for launching the background task and the execution criteria based on a component status of the device;
monitoring a running state of the device for an occurrence of the execution criteria;
determining an available device headroom to run the background task when the execution criteria occurs, and
requesting a launch of the background task based on a comparison of the available device headroom and a background task importance and the background task importance is a measure of how important it is for the device to run the background task and the background task importance changes to have a plurality of different values during a grace period that occurs after the executing criteria occurs and prior to the request of the launch of the background task, wherein the background task is executed by a processing unit of the device after being launched.

15. The method of claim 14, wherein the component status is selected from the group comprising device power state, central processing unit status, display status, storage system status, and network connectivity.

16. The method of claim 15, wherein the device power state is selected from the group comprising idle, busy, and percentage level.

17. The method of claim 15, wherein the central processing unit status is selected from the group comprising busy, idle, and percentage threshold.

18. The method of claim 14, further comprising:
if the execution criteria is no longer met,
deferring execution the background task.

19. The method of claim 14, further comprising:
determining the background task has completed execution; and
if the background task is a recurring task,
rescheduling the background task to execute at a future time.

20. A device to schedule a background task for a device, the device comprising:
a set of one or more processors;
a memory coupled to the set of one or more processors though a bus; and
a process executed from the memory by the set of one or more processors to cause the set of one or more processors to receive an execution criteria for the background task, monitor a running state of the device for an occurrence of the execution criteria, determine an available device headroom to run the background task when the execution criteria occurs, and request a launch of the background task based on a comparison of the available device headroom and a background task importance and the background task importance is a measure of how important it is for the device to run the background task and the background task importance changes to have a plurality of different values during a grace period that occurs after the executing criteria occurs and prior to the requesting of the launch of the background task, wherein for the receiving the execution criteria further causes the set of one or more processors to store an execution criteria for the background task, the execution criteria indicates one or more criteria for launching the background task and the execution criteria based on a component status of the device, wherein the background task is executed by the set of one or more processors of the device after being launched.

21. The device of claim 20, wherein the process further causes the set of one or more processors to, if the execution criteria is no longer met, defer execution of the background task.

* * * * *